(12) United States Patent
Braun

(10) Patent No.: US 7,026,734 B2
(45) Date of Patent: Apr. 11, 2006

(54) TIMING DISC FIXING

(75) Inventor: Richard Braun, Troisdorf (DE)

(73) Assignee: PWB-Ruhlatec Industrieprodukte GmbH, Seebach (DE)

(*) Notice: Subject to any disclaimer, the term of this patent is extended or adjusted under 35 U.S.C. 154(b) by 0 days.

(21) Appl. No.: 11/001,773

(22) Filed: Dec. 1, 2004

(65) Prior Publication Data

US 2005/0141664 A1   Jun. 30, 2005

(30) Foreign Application Priority Data

Dec. 2, 2003   (DE) .................... 103 56 224

(51) Int. Cl.
*G01D 5/34*   (2006.01)
(52) U.S. Cl. .................. 310/68 B; 377/17; 250/231.13
(58) Field of Classification Search ............. 310/68 B, 310/79; 377/17; 250/231.13
See application file for complete search history.

(56) References Cited

U.S. PATENT DOCUMENTS

| | | | |
|---|---|---|---|
| 3,729,728 A * | 4/1973 | Hardway, Jr. .......... 340/870.37 |
| 3,829,184 A | 8/1974 | Chevret |
| 4,034,612 A | 7/1977 | Buckwitz |
| 4,118,134 A | 10/1978 | Mansel |
| 4,188,828 A | 2/1980 | Cuccolini |
| 4,306,838 A | 12/1981 | Trainer |
| 4,355,403 A | 10/1982 | Spaniol et al. |
| 4,424,413 A | 1/1984 | Skobranek |
| 4,654,575 A | 3/1987 | Castleman |
| 4,709,320 A | 11/1987 | Konopka |
| 4,737,673 A | 4/1988 | Wrobel |
| 4,753,112 A | 6/1988 | Wetterhorn et al. |
| 4,796,354 A | 1/1989 | Yokoyama et al. |
| 4,835,505 A | 5/1989 | Hattori et al. |
| 4,859,110 A | 8/1989 | Dommel |
| 4,942,295 A | 7/1990 | Brunner et al. |
| 5,057,684 A | 10/1991 | Service |
| 5,081,416 A | 1/1992 | La Croix |
| 5,081,756 A | 1/1992 | Abe et al. |
| 5,120,588 A * | 6/1992 | Alff et al. .................. 428/66.7 |
| 5,155,401 A | 10/1992 | Kanaya et al. |
| 5,184,038 A | 2/1993 | Matsui et al. |
| 5,281,099 A | 1/1994 | Hunter et al. |
| 5,337,817 A | 8/1994 | Steinbeck et al. |
| 5,492,024 A | 2/1996 | Siner |

(Continued)

FOREIGN PATENT DOCUMENTS

DE           2628146 C2      2/1982

(Continued)

OTHER PUBLICATIONS

G. Niemann "Maschinenelemente" Springer-Verlag 1963, Kapitel: Reibschlussverbindungen und Formschlussverbindungen. pp. 281-288.

(Continued)

*Primary Examiner*—Darren Schuberg
*Assistant Examiner*—Erik Preston
(74) *Attorney, Agent, or Firm*—Darby & Darby

(57) ABSTRACT

The invention relates to a timing disc fitting for an encoder system. It consists of a timing disc hub (1) which can be plugged to a motor shaft (2) and to which there is fixed a timing disc (3). In accordance with the invention, the timing disc hub consists of a metallic heat-conducting material to which, on one side, a plastic insulating material is adhered. In the flange plane (1a) of the timing disc hub (1) there are arranged projections or lugs (5, 6, 7) which engage correspondingly shaped indentations, recesses or cut-outs (3a, 3b) in the timing disc (3).

5 Claims, 3 Drawing Sheets

U.S. PATENT DOCUMENTS

| | | | |
|---|---|---|---|
| 5,594,333 A | 1/1997 | Whipple, III | |
| 5,606,475 A | 2/1997 | Ishizuka | |
| 5,647,683 A | 7/1997 | Easley | |
| 5,708,496 A | 1/1998 | Barnett et al. | |
| 5,762,439 A | 6/1998 | Siner | |
| 5,859,425 A | 1/1999 | Mleinek et al. | |
| 5,883,384 A | 3/1999 | Kato et al. | |
| 5,959,383 A | 9/1999 | Winzen et al. | |
| 5,975,271 A | 11/1999 | Iwata | |
| 6,013,961 A * | 1/2000 | Sakamaki et al. | 310/68 B |
| 6,175,196 B1 | 1/2001 | Ragner et al. | |
| 6,198,183 B1 * | 3/2001 | Baeumel et al. | 310/52 |
| 6,316,930 B1 | 11/2001 | Camin | |
| 6,339,964 B1 * | 1/2002 | Bertetti | 73/862.334 |
| 6,414,450 B1 | 7/2002 | De Wulf | |
| 6,536,267 B1 | 3/2003 | Kieselbach | |
| 6,559,633 B1 * | 5/2003 | Nachtigal et al. | 324/174 |
| 6,710,480 B1 * | 3/2004 | Baumeister et al. | 310/68 B |
| 2005/0040782 A1 * | 2/2005 | Jasinski et al. | 318/446 |

FOREIGN PATENT DOCUMENTS

| | | |
|---|---|---|
| DE | 3232258 A1 | 5/1983 |
| DE | 3543992 A1 | 7/1986 |
| DE | 3408437 C2 | 1/1987 |
| DE | 3926799 A1 | 2/1991 |
| DE | 4409892 A1 | 9/1995 |
| DE | 69114262 | 12/1995 |
| DE | 19601965 A1 | 7/1997 |
| DE | 19641929 A1 | 4/1998 |
| EP | 0468147 A2 | 1/1992 |
| EP | 0725280 A1 | 8/1996 |
| GB | 2196287 A | 4/1988 |
| GB | 2332280 A | 6/1999 |
| JP | 47-20729 | 7/1972 |
| JP | 63-228024 | 9/1988 |
| JP | 3003723 | 1/1991 |
| JP | 10-122902 | 5/1998 |
| WO | WO-9514178 | 5/1995 |
| WO | WO-96/14798 | 5/1996 |
| WO | WO 9943071 A1 * | 8/1999 |

OTHER PUBLICATIONS

"Motorencoder" IBM Technical Disclosure Bulletin—vol. 30 No. 3 Aug. 1987.

Patent Abstracts of Japan "Low-Noise Cooling Fan For Variable-Speed Machine", Ford Motor Co., Publication No. 03-107348; Date of Publication: May 7, 1991.

Patent Abstracts of Japan: "Operation Mode Switching Control Device for Automatic Machine" Omron Corp.; Publication No. 03-009470; Date of Publication: Jan. 17, 1991.

English Abstract of EP 0 557 564 A1.

Abstract: Patent DE 198 36 666 C1; Applicant: Kostal GmbH & Co KG—2 pages.

Abstract of DE19855064—"Optoelectronic steering angle sensor to determine absolute position of steering wheel of motor vehicle; has common sensor array to detect code tracts for each functional unit" Kostal Leopold GmbH & KG; Publication Date: May 31, 2000.

DE 40 22 837 A1—"Signal generator for motor vehicle steering angle—has disc with spiral slot rotating between linear light source and photoelectric receiver".

DE 198 38 731 A1—"Steering angle sensor to dtermine absolute angle setting of motor vehicle sterring wheel using 2 sensor units 1 within angle setting from total wheel rotation range with sensor rotor" Kostal Leopold GmbH & Co. KG.

DE 3803853—"Method and device for measuring rolling angles on moving machine parts"; Carl Zeiss FA; Publication Date: Aug. 17, 1989.

Patent Abstract of Japan: "Spindle Motor Mechanism for Disc Device"; Hitachi Ltd., Publication No.: 62-092162; Publication Date: Apr. 27, 1987.

* cited by examiner

TIMING DISC FIXING

BACKGROUND OF THE INVENTION

The invention relates to a timing disc fitting for encoder systems, consisting of the timing disc, a timing disc hub and optionally further fitting means such as glued, threaded or clamped connections.

SUMMARY OF THE INVENTION

In accordance with the invention, the objective is achieved by the characteristics listed in the claims. It has been found that a timing disc consisting of a metallic plate coated with a plastic insulating material on one side permits a high degree of heat discharge, wherein, as a result of the mechanical clamping condition, a clearance-free transmission of changing torque values is guaranteed, even under the influence of varying temperatures.

Below, the invention will be explained in greater detail with reference to several embodiments.

THE DRAWINGS

DETAILED DESCRIPTION

Figure 1:
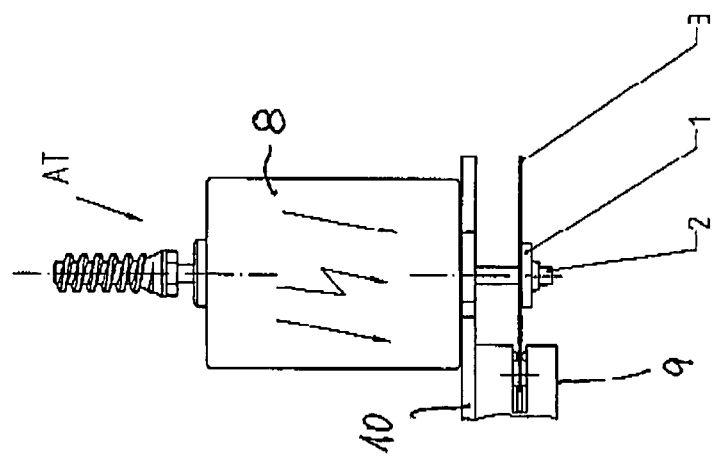
FIG. 1 shows the inventive timing disc fitting in an encoder system.

FIG. 1 shows the timing disc hub 1 on the motor shaft 2 of a motor 8 in a mounted condition. During the rotational movement of the motor shaft 2, the timing disc 3 is carried along and rotates in the gap of a C-shaped motor sensor component 9 which is secured to a PCB conductor plate 10.

Figure 2:
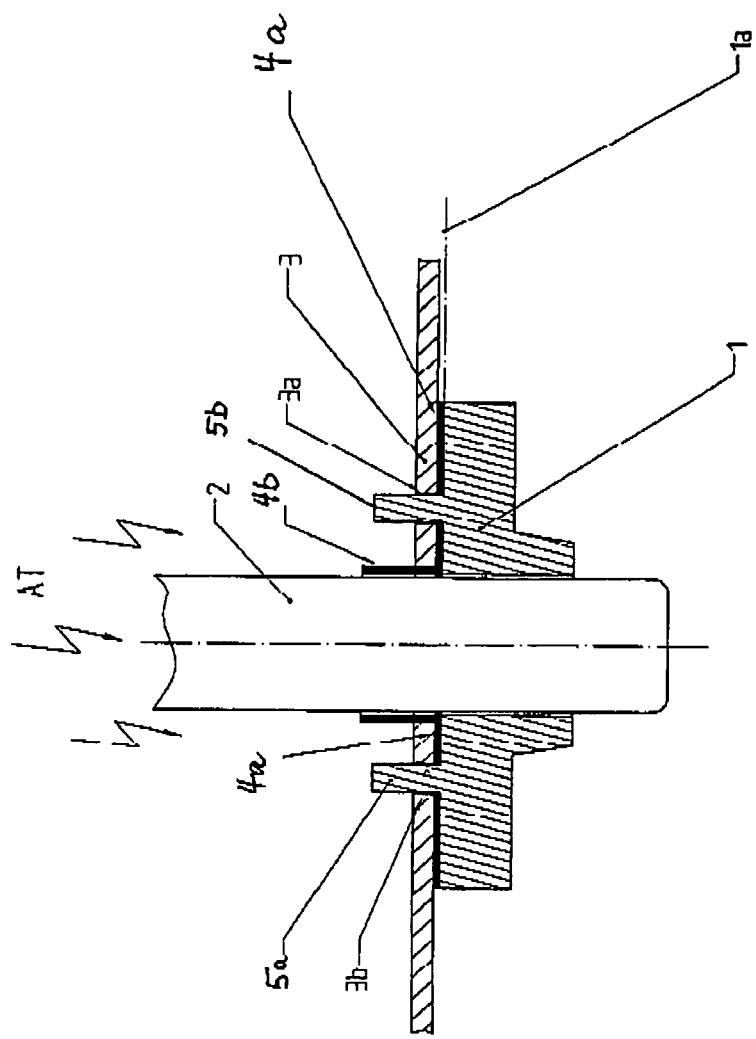
FIG. 2 is an enlarged partial section of the region of the timing disc fitting according to a first embodiment of the invention.

In the enlarged partial section (FIG. 2) it is possible to see the design principle of the inventive timing disc fitting. The timing disc hub is slipped on to the motor shaft 2 with no clearance and joined to timing disc 3 by recesses 3a, 3b, 3c. The fitting is of the form-fitting type and is effected by projections in the form of lugs 5a, 5b, with a plastic insulating material 4A being arranged between the timing disc hub 1 and the timing disc 3.

Figure 3:
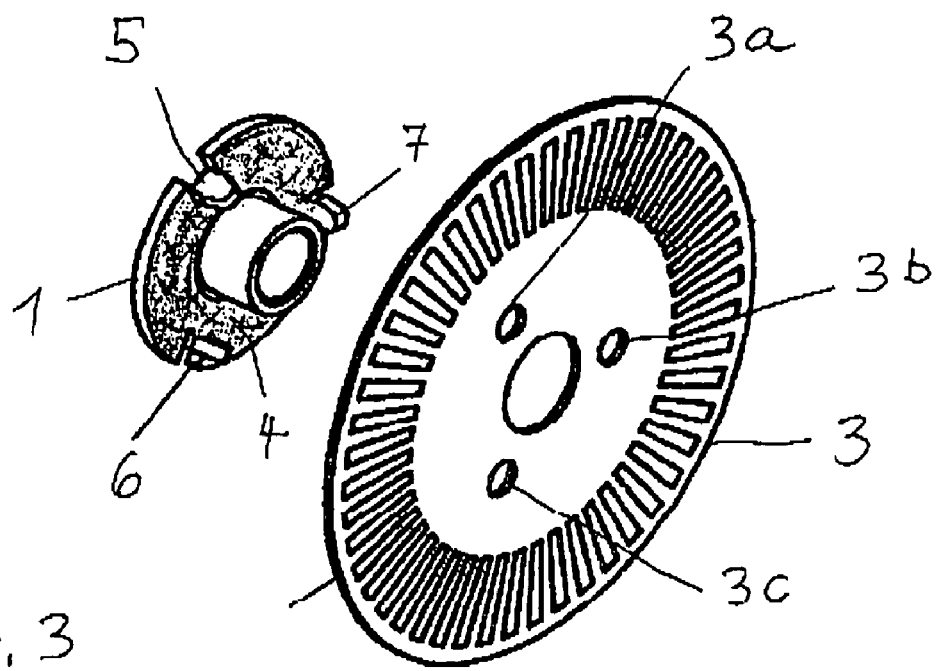
FIG. 3 shows the inventive timing disc fitting of the second embodiment in an exploded view (unjoined) according to a second embodiment of the invention.

FIG. 3 shows a second embodiment of the timing disc hub 1 and the timing disc 3 prior to being joined. The lugs 5, 6, 7 at the timing disc hub 1 are aligned in such a way that they can be introduced into the respective bores 3a, 3b, 3c of the timing disc 3.

Figure 4:
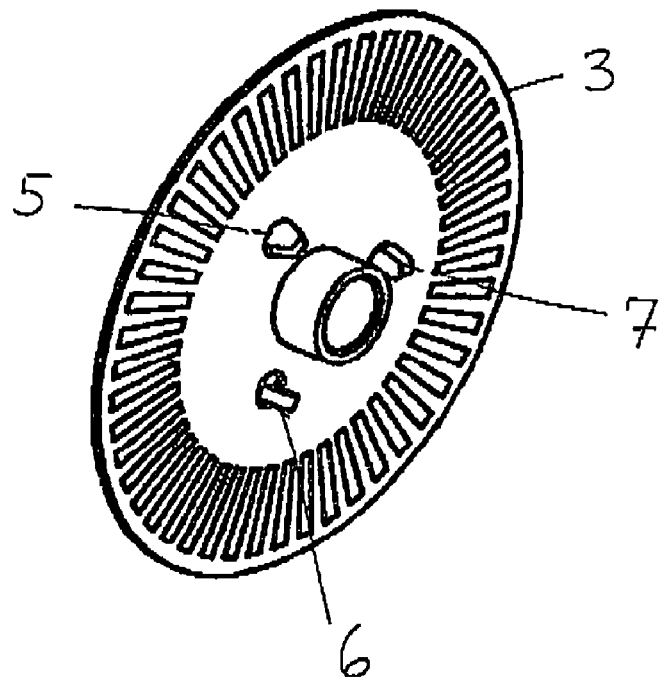
FIG. 4 shows the inventive timing disc fitting of the second embodiment in a front view (joined)

After the timing disc hub 1 and the timing disc 3 have been joined, the lugs 5, 6, 7 are positioned so that the hub and disc can be clamped together. This position is shown in FIG. 4, with the timing disc 3 in its joined condition being visible in a front view.

Figure 5:
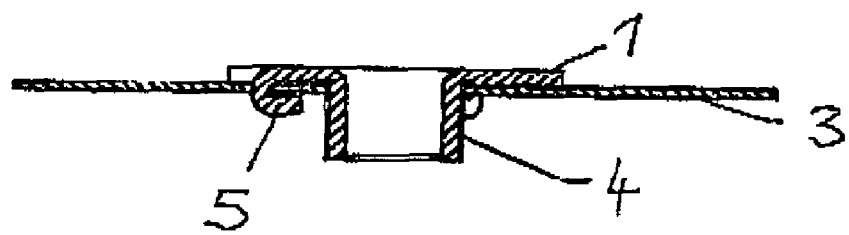
FIG. 5 is a cross-section through the inventive timing disc fitting (joined) of the second embodiment.

FIG. 5 shows the structure after joining and after the lug 5 has been bent. In this way, the timing disc hub 1 and the timing disc 3 are secured in a clearance-free and permanent way. In the cross-sectional illustration of FIG. 5 it can be seen that the timing disc 1 is coated with a plastic insulating material 4. The plastic coating on one side ensures that the heat flow from the encoder end is discharged via the motor shaft, but because of the insulating effect of the plastic coating, the timing disc 3 is thermally isolated from the disc hub and motor shaft. Thus, the discharge of heat does not affect the accuracy of the timing disc.

Figure 6:
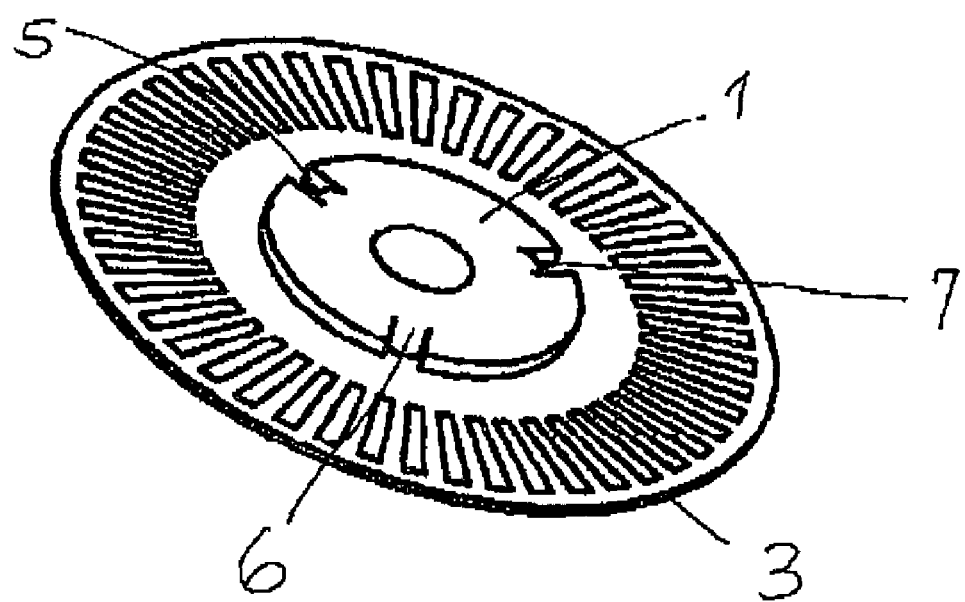
FIG. 6 shows the inventive timing disc fitting of the second embodiment in a rear view (joined).

FIG. 6 shows the inventive timing disc fitting in a rear view, with the timing disc hub 1 being permanently connected to the timing disc 3 via the bent lugs 5, 6, 7.

What is claimed is:

1. A timing disc fitting for an encoder system, comprising a timing disc hub (1) which can be plugged to a motor shaft (2) and a timing disc (3) fixed to said timing disc hub and including a plurality of recesses (3a, 3b), said timing disc hub comprising a metallic heat conducting material and a plastic insulating material (4) adhered to one side of said timing disc, said timing disc hub including projections (5, 6, 7) which engage correspondingly recesses (3a, 3b) in the timing disc (3).

2. A timing disc fitting according to claim 1, wherein the plastic insulating material (4) is arranged on the side (1b) of the timing disc hub (1) which faces the timing disc (3).

3. A timing disc fitting according to claim 1, wherein the plastic insulating material is a film, a foil or a paint.

4. A timing disc fitting according to claim 3, wherein the plastic insulating material is self-adhesive.

5. A timing disc fitting according to claim 1, wherein the projections (5, 6, 7) are in the form of hooks, knobs, lugs or bent metal strips.

* * * * *